United States Patent [19]
D'Acquisto

[11] Patent Number: 5,060,756
[45] Date of Patent: Oct. 29, 1991

[54] CAST METAL TREESTAND

[76] Inventor: Andrae T. D'Acquisto, 5615 S. Pennsylvania Ave., Cudahy, Wis. 53110

[21] Appl. No.: 560,150

[22] Filed: Jul. 31, 1990

[51] Int. Cl.⁵ ............................................ A01M 31/02
[52] U.S. Cl. .................................... 182/187; 108/152
[58] Field of Search ............... 182/187, 188, 135, 134, 182/92, 152

[56] References Cited

U.S. PATENT DOCUMENTS

| | | | |
|---|---|---|---|
| 3,749,200 | 7/1973 | Meyer | 182/187 |
| 3,767,011 | 10/1973 | Witt | 182/187 |
| 4,601,364 | 7/1986 | York | 182/187 |
| 4,869,520 | 9/1989 | Cole | 182/92 |

Primary Examiner—Reinaldo P. Machado
Attorney, Agent, or Firm—Andrus, Sceales, Starker & Sawall

[57] ABSTRACT

A portable treestand for hunters includes a one piece supporting platform cast from a light weight metal, preferably aluminum. The unitary construction of the platform eliminates a large number of fabrication steps and the related fastening techniques and devices used therewith. As a result, the platform is stronger and more rigid, free of many potentially movable joints, and may be made with an irregular pattern. The grate-like pattern of irregular oepnings in the platform provides variable positioning support for different types of archery bows and enhances the ability to camouflage the treestand.

7 Claims, 2 Drawing Sheets

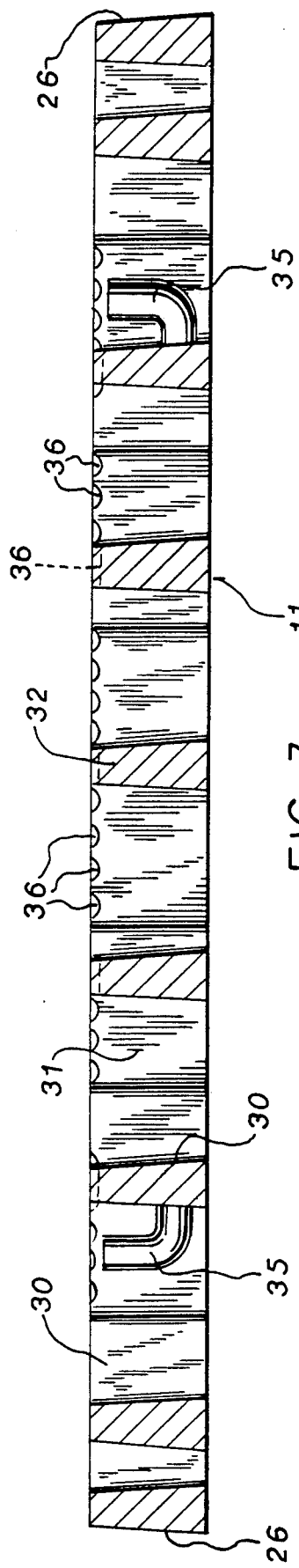
FIG. 3
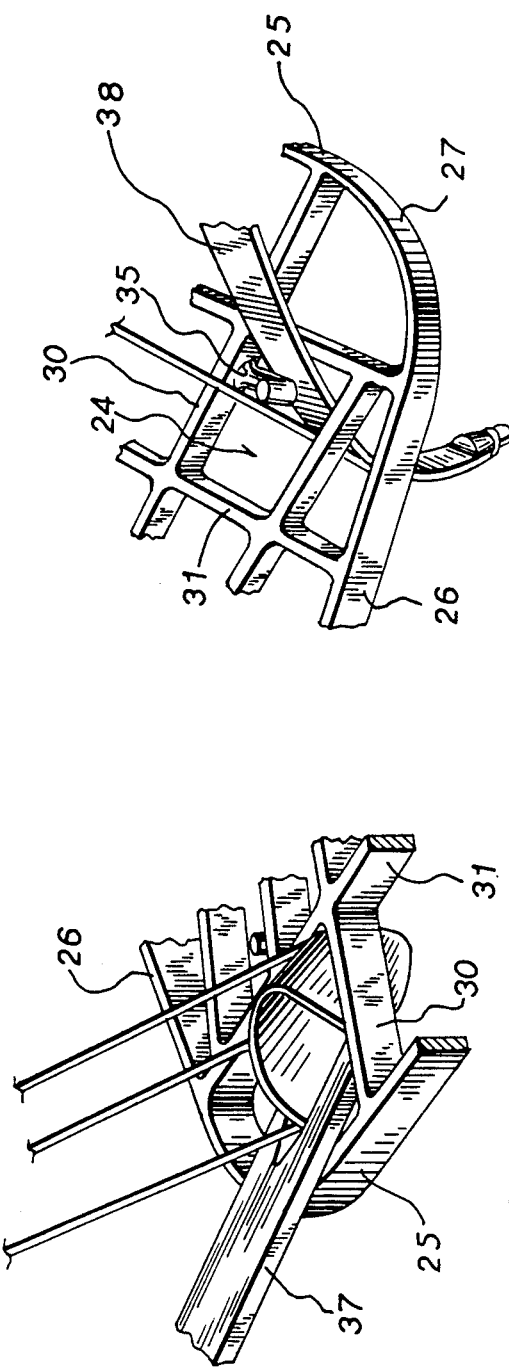
FIG. 5
FIG. 4

CAST METAL TREESTAND

BACKGROUND OF THE INVENTION

The present invention pertains to a portable treestand for hunting or the like and, in particular, to a treestand in which the main supporting platform is constructed of a one-piece lightweight metal construction.

Portable treestands for hunting, which are demountably attachable to the truck of a tree to provide an improved vantage point, have been used for many years. Such treestands are available in an extremely wide variety of types, providing a myriad of sizes, shapes, materials of construction, mounting mechanisms and other features. Key among the important features to be considered by a hunter in choosing a treestand are safety, weight, simplicity of construction and use, and camouflage or capability of masking the construction from hunted game. The considerations of safety and weight are often conflicting because adequate strength frequently requires the use of heavier and stronger structural members. Lightweight structural materials are, therefore, used almost exclusively in the construction of treestands. To balance the considerations of strength, weight and cost, structural aluminum has been the material of choice. As a result, the majority of treestands on the market today utilize some type of tubular aluminum supporting structure for the main supporting platform of the treestand. The tubular aluminum supporting structure may include cross members which are closely enough spaced to provide the platform on which the hunter may stand directly. More often, however, the structural aluminum framework generally defines the outer perimeter of the platform and includes a few intermediate cross members. The supporting framework is covered with a thin rigid layer of floor material of any of several types, including sheets of wood or plastic and expanded metal grids.

In each of the prior art treestand platforms broadly included in the various types described above, the platform is fabricated from a plurality of components using a variety of fastening techniques, including welding, rivets, screws and bolts. Even in those treestand platform constructions in which the structural aluminum members are closely spaced so that a separate floor covering is not required, a large amount of welding is required in the fabrication process. Where a floor cover or plate is also required, additional welding or the use of other types of fasteners must be undertaken. The inventor is not aware of any prior art treestand in which the platform does not require a series of tedious, time consuming and expensive fabrication steps.

It is also well known that welds occasionally break and that the welding process itself may have an adverse affect on the strength or structural integrity of the members as a result of high welding heat. The use of mechanical fasteners in the fabrication of a platform creates joints which inherently are not completely rigid and as a result may move and squeak or create other noises. Skilled hunters are extremely sensitive to any equipment that is unnecessarily noisy. Fasteners and fastener joints also present the potential for catching clothing or the like which is both annoying and potentially dangerous. Finally, all prior art fabricated treestand platforms are characterized by some sort of regular geometric pattern in either or both the supporting structure and the floor layer or covering. Skilled hunters are also aware that ordered structural patterns are generally an anomaly in the wild and, when seen by hunted animals, may keep them from approaching or cause them to flee.

Thus, despite the extremely wide variety of treestand platforms disclosed in the prior art and on the market today, all are subject to the same problems and deficiencies in construction, operation and use described above. It would be most desirable, therefore, to have a treestand including a platform which is of simple construction, does not require welded fabrication or the use of fasteners, and yet is strong and light weight. In addition, the platform should be readily adaptable for use in both climbing and non-climbing stand constructions. It would also be desirable to have a treestand platform which does not present a noticeable geometric pattern to approaching game. Finally, a treestand platform which would eliminate the need for the attachment of accessory holders, such as a bow holder, would be most attractive.

SUMMARY OF THE INVENTION

In accordance with the present invention, a portable treestand includes a supporting platform of one piece, rigid construction having an open grate-like construction. The unitary rigid one piece construction of the platform may be implemented in a form which eliminates virtually every problem characteristic of prior art fabricated platforms.

In its preferred embodiment, the grate-like construction of the platform of the present invention is characterized by a plurality of irregularly shaped openings, which openings vary in size, shape and orientation, when viewed in horizontal section through the platform, in directions extending radially and tangentially to the trunk of the tree on which the treestand is mounted. The platform is preferably made from a metal casting and, most preferably an aluminum casting.

The plurality of irregularly shaped openings includes a series of openings extending along the outer edge of the platform, remote from the tree trunk to which it is attached, which are sized to receive and support the lower end of an archery bow and are directionally oriented to position the bow at selectively variable radial angles from the center of the tree. The bow-receiving openings are preferably sized and shaped to accept the lower end of either a compound bow or a recurve bow.

BRIEF DESCRIPTION OF THE DRAWINGS

FIG. 3 is a sectional view taken on line 3—3 of FIG. 2.

FIG. 4 is a detailed perspective of a portion of the treestand platform showing its utility for supporting an archery bow.

FIG. 5 is a perspective view similar to FIG. 4 showing the platform used to support another type of bow.

DETAILED DESCRIPTION OF THE PREFERRED EMBODIMENT

Figure 1:
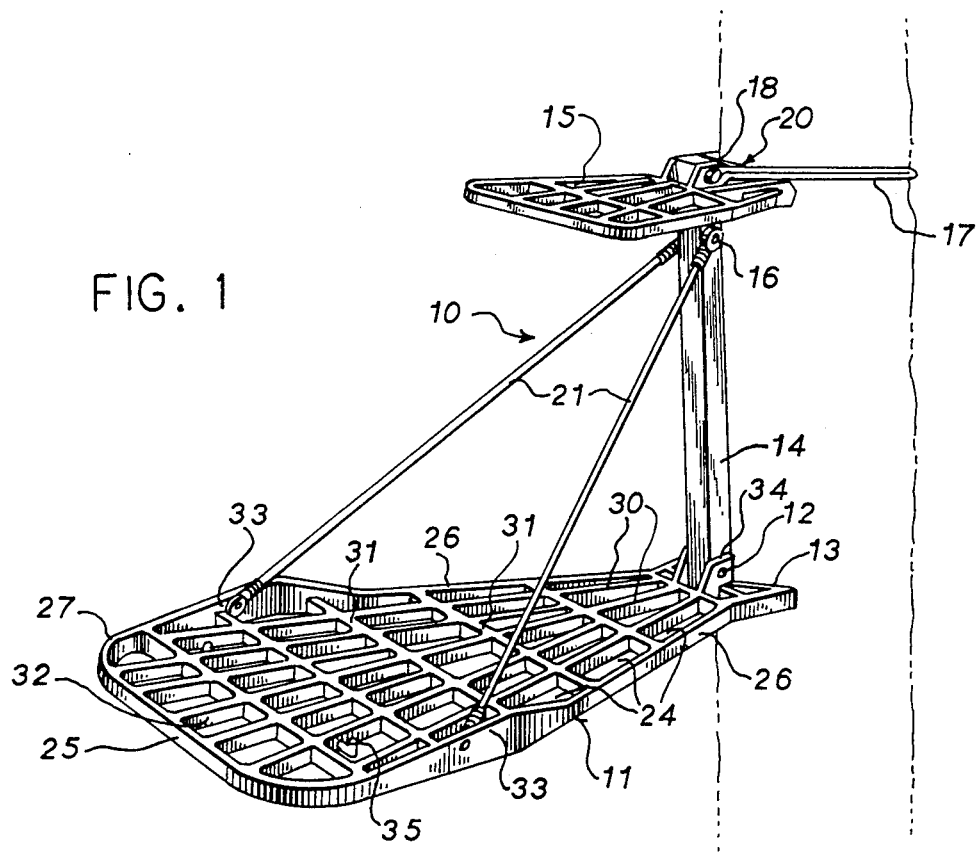
FIG. 1 is a perspective view of a treestand of the present invention shown mounted on the trunk of a tree.

Referring initially to FIG. 1, the treestand 10 of the present invention includes a unique supporting platform 11 of uniform, one piece rigid construction. The platform 11 is of unitary construction and is preferably cast from aluminum. The platform may be used in a wide variety of treestand constructions. The treestand 10 shown in FIG. 1 is a non-climbing type, but the platform 11 is adaptable for use in so called "climbing" treestands which may be moved, by the action of the hunter standing or sitting thereon, upwardly along the trunk of a tree to a final desired position.

The platform 11 of the treestand 10 is attached adjacent its inner edge 13 by a lower hinged connection 12 to a rigid center post 14. A seat 15 is attached by upper hinged connection 16 to the upper end of the center post 14. The seat 15 may be constructed similarly to the platform 11, but of a substantially smaller size, and preferably also comprises an aluminum casting.

The primary mounting attachment for the treestand comprises a rope 17 attached at one end to the seat 15 adjacent the upper hinged connection 16 and extending around the tree trunk to a similar attachment at its other end adjacent the opposite side of the upper hinged connection 16. The inner edge 18 of the seat 15 includes a V-shaped notch 20 which is provided with tree engaging teeth and is positioned with respect to the upper hinged connection 16 such that downward pivotal movement of the seat from an initial vertical position against the tree trunk, causes the center post 14 to move outwardly from the tree trunk, puts the rope 17 in tension, and causes the teeth in the V-shaped notch 20 to bite into the tree. The main supporting platform 11 is maintained in a generally horizontal position with a pair of supporting cables 21 each of which is connected by its upper end to the center post 14 just below the upper hinged connection 16 and by its lower end to the lateral edge of the platform at a point outwardly from the tree trunk. The inner edge 13 of the platform is provided with a large V-shaped notch 22 which is also provided with teeth on its tree-engaging face to help hold the treestand securely in position once the rope connection 17 has been securely locked around the tree trunk.

The unique platform 11 of the present invention comprises an open grate-like pattern 23 which is characterized by a plurality of irregularly shaped openings 24 which vary substantially in size, shape and orientation in the horizontal plane of the platform 11. The variations in the openings 24 are in directions both radially from the center of the tree and tangentially to the tree trunk.

Figure 2:
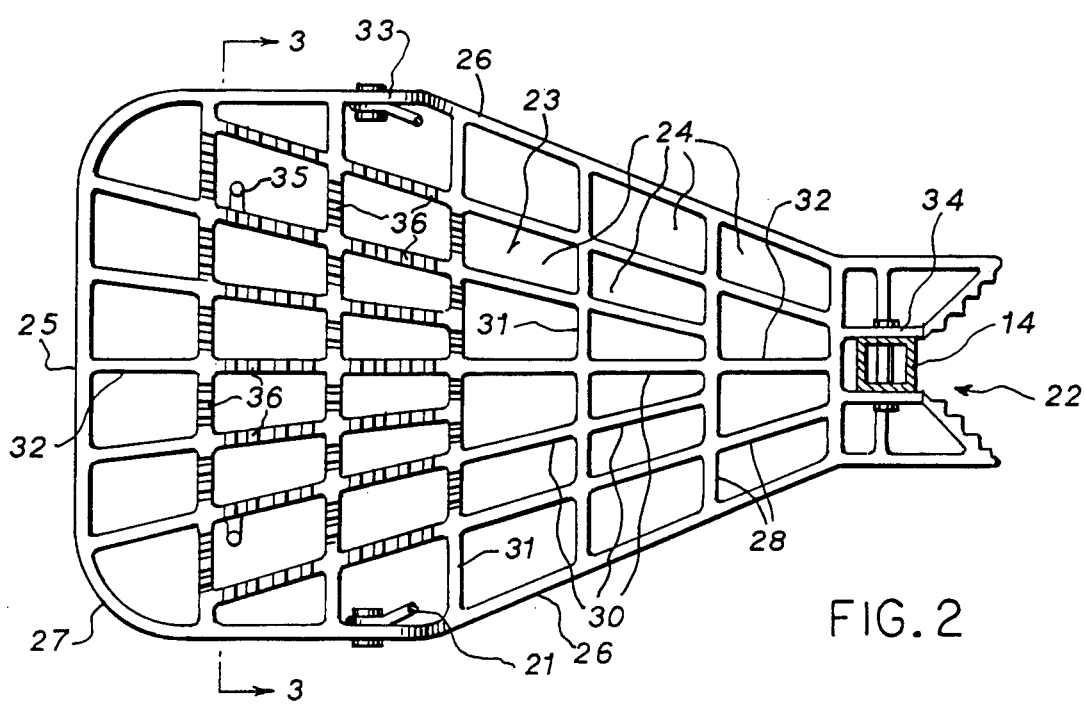
FIG. 2 is a top plan view of the main supporting platform of the treestand, utilizing the unique one piece construction and showing the open gratelike configuration.

Referring also to FIG. 2, the platform 11 has a generally trapezoidal shape with the outer edge 25 defining the base from the ends of which two convergent side edges 26 extend generally radially toward the tree to integral connections with the edges of the V-shaped notch 22 on the inner edge 13 of the platform. Rounded corners 27 preferably define the transitions between the outer edge 25 and the side edges 26. The grate-like pattern 23 is provided by a series of intersecting interior members 28 including radial members 30 and intersecting cross members 31.

The overall pattern 23 resulting from the positioning of the interior members 28 defines a plurality of openings 24, most of which are generally trapezoidal in shape and small enough to provide fully adequate support for a hunter standing thereon. The pattern of openings 24 is preferably symmetrical with respect to a center radial member 32 which extends between the midpoints of the inner edge 13 and outer edge 25. However, the openings on either side of the central radial member 32 vary from each of the other openings on that side in size and shape, as well as tangential or radial orientation with respect to the tree to which the platform is attached. As a result, the overall appearance of the platform 11 is one of irregular shapes which enhances the desirable camouflage characteristics of any treestand with which the platform may be used.

Referring also to FIG. 3, because the unitary platform 11 is preferably made from an aluminum casting, all of the integral members, including the outer edge 25, side edges 26, inner edge 13 and interior members 28, are provided with a slight draft on their vertical faces. In the embodiment shown, the draft, which may be approximately 3°, results in downwardly divergent faces on the various members when viewed in cross section.

Another significant advantage of the unitary construction of the platform 11 is that all features necessary to accommodate attachment or connection to the other components of the treestand may be molded integrally into the platform, thereby avoiding fabricated assembly or attachment of additional pieces. Likewise, accessory features may also be included in the integral casting, as will be described hereinafter. For example, the side edges 26 may include vertically extended flanges 33 to accommodate attachment of the ends of the supporting cables 21. The lugs 34 on the inner edge 13 to accommodate the pin for the lower hinged connection 12 are also integrally cast into the platform. Auxiliary equipment hooks 35 may also be cast integrally with certain interior members, such as radial members 30 to accommodate lift lines or the like and to provide for their storage in a safe and convenient position. Other accessory attachments could also be cast integrally with the platform to provide a variety of desirable auxiliary functions. As indicated, the inclusion of all necessary integral attachments and any desired auxiliary attachments may be made without utilizing supplemental welding, mechanical fasteners, or any other fabrication techniques or devices, all of which would otherwise add to assembly time and costs, create joints which may potentially weaken the structure, and introduce movable joints which may result in undesirable noises. The platform 11 may also be cast with small traction channels 36 in the upper surfaces of all or some of the interior members 28. The combination of the open grate-like pattern of the platform, along with the traction channels 36, provides a superior non-slip surface even in inclement weather conditions.

As shown in FIGS. 4 and 5, certain of the openings 24 in the platform may be utilized, without any adaptation or auxiliary attaching device, to support a bow in a secure and readily accessible manner. In particular, the larger openings in the first two parallel rows adjacent the outer edge 25 are of a large enough size and an appropriate shape to receive the end of a typical compound bow 37 or a recurve bow 38. In addition, because of the variation in orientation provided by the radial members 30, either type of bow may be oriented angularly in various selected directions from the center of the tree. Again, no separate bow attachment device is required. The openings 30 containing the auxiliary hooks 35 are particularly well suited to support a recurve bow, as shown in FIG. 5.

The inherent strength increase provided by a solid unitary cast aluminum construction allows the size of the interior members 28 to be reduced, as well as their spacing. The solid construction also reduces the transmission of noise more common in constructions utilizing hollow tubular structural members. The entire outer surface of the platform may be anodized with an irregular contrasting pattern to further enhance its camouflage appearance.

Various modes of carrying out the present invention are contemplated as being within the scope of the following claims particularly pointing out and distinctly claiming the subject matter which is regarded as the invention.

I claim:

1. A portable treestand for demountable attachment to the trunk of a tree, said treestand comprising:
   a main supporting platform made of cast metal at least approximately as light and strong as aluminum, said platform adapted to be attached at an inner platform edge to the tree trunk, and to extend generally horizontally outward from the trunk to an outer platform edge;
   said platform being of uniform, one piece rigid construction having an open grate-like configuration; and,
   attachment means connected to said platform for attaching said platform to the tree.

2. The apparatus as set forth in claim 1 wherein the grate-like construction of said platform comprises a plurality of irregularly shaped openings, which openings vary in size, shape and orientation in horizontal section in directions radially of the center of and tangentially to the trunk of the tree.

3. The apparatus as set forth in claim 1 wherein the underside of the platform is flat and free of any structure depending downwardly therefrom.

4. A treestand comprising:
   a main supporting platform adapted to extend horizontally outward from the trunk of a tree, said platform being of one piece metal construction and having an open grate-like configuration characterized by a plurality of irregularly shaped openings varying in size, shape and orientation in directions radially and tangentially with respect to the tree; and,
   attachment means connected to said platform for encircling and attaching said platform to the tree.

5. The apparatus as set forth in claim 4 wherein said plurality of irregularly shaped openings includes a series of openings adjacent the edge of said platform remote from said attachment means, said series of openings sized to receive and support the lower end of an archery bow and oriented to position the bow at selectively variable angular directions from the tree.

6. The apparatus as set forth in claim 4 wherein said platform comprises an aluminum casting.

7. The apparatus as set forth in claim 6 wherein said plurality of irregularly shaped openings includes a series of openings sized to receive the lower end of a compound archery bow and a recurve archery bow, said series of openings oriented to support and position said bows at selectively variable angular directions radially from the center of the tree.

* * * * *